(12) United States Patent
Sekime

(10) Patent No.: US 8,064,016 B2
(45) Date of Patent: Nov. 22, 2011

(54) LIQUID CRYSTAL DISPLAY DEVICE AND ELECTRONIC APPARATUS

(75) Inventor: Tomoaki Sekime, Azumino (JP)

(73) Assignee: Sony Corporation, Tokyo (JP)

( * ) Notice: Subject to any disclaimer, the term of this patent is extended or adjusted under 35 U.S.C. 154(b) by 393 days.

(21) Appl. No.: 12/424,657

(22) Filed: Apr. 16, 2009

(65) Prior Publication Data

US 2009/0316093 A1    Dec. 24, 2009

(30) Foreign Application Priority Data

Jun. 19, 2008  (JP) ................. 2008-160062

(51) Int. Cl.
*G02F 1/1335* (2006.01)
(52) U.S. Cl. ........................................ 349/117
(58) Field of Classification Search .......... None
See application file for complete search history.

(56) References Cited

U.S. PATENT DOCUMENTS 7,688,406 B2 * 3/2010 Itou et al. ............ 349/114

FOREIGN PATENT DOCUMENTS

| JP | 59-189325 | 10/1984 |
| JP | 2004-170875 | 6/2004 |

\* cited by examiner

*Primary Examiner* — Sung Pak
(74) *Attorney, Agent, or Firm* — K&L Gates LLP

(57) ABSTRACT

There is provided a liquid crystal display device including a first substrate in which a first electrode and a second electrode are provided, the second electrode having a plurality of line-shaped portions that generate an electric field between the first electrode, a second substrate opposing the first substrate, a liquid crystal layer sandwiched between the first substrate and the second substrate, the liquid crystal layer being partitioned into a plurality of display pixels each of which is driven by the electric field, a polarization film arranged outside the second substrate, and an optical member film arranged outside the polarization film. The optical member film has a front phase difference whose retardation value is in the range of 120 to 160 nm, and an angle of an optical axis of the optical member film with respect to an extending direction of the plurality of line-shaped portions of the second electrode is in the range of 30 to 40 degrees or 50 to 60 degrees.

5 Claims, 8 Drawing Sheets

LIQUID CRYSTAL DISPLAY DEVICE AND ELECTRONIC APPARATUS

This application claims the benefit of Japanese Patent Application No. 2008-160062, field on Jun. 19, 2008. The entire disclosures of the prior applications are hereby incorporated by reference herein in their entirety.

BACKGROUND

1. Technical Field

The present invention relates to a liquid crystal display device and an electronic apparatus.

2. Related Art

The liquid crystal display device is mainly constituted by a liquid crystal display panel and an illumination device. The light emitted from the illumination device is transmitted through the liquid crystal display device to illuminate the liquid crystal display panel. The liquid crystal display panel has a structure in which liquid crystal is sandwiched by two substrates. A lower polarization film is provided on an outer surface of the liquid crystal display panel at the illumination device side, and an upper polarization film is provided on an outer surface of the liquid crystal display panel at an observer side. Gradation of the liquid crystal display panel is varied by inverting liquid crystal molecules to control the alignment.

A polarization film of an absorption type is generally used in the liquid crystal display device. Accordingly, there is a problem in that a point at which blackout (disappearance) occurs inevitably appears when the liquid crystal display device is rotated up and down and right and left when an observer wears polarization sunglasses or the like. The blackout occurs when the transmission axis of the polarization sunglasses and the axis of the light transmitted through a retardation film and the polarization films of the liquid crystal panel to be emitted are not coincident. In order to eliminate the occurrence of the blackout, there is a liquid crystal display device by which the light emitted to the observer side is converted into circular polarized light (elliptically polarized light) from straight line polarized light by regulating the angle made by the absorption axis of the front side polarization film and the slow axis of the retardation film disposed thereon (for example, see JP-A-59-(hereinafter, referred to as Patent Document 1) or JP-A-2004-170875 (hereinafter, referred to as Patent Document 2).

However, in the case of Patent Document 1 or 2, since light is passed through the retardation film having a large retardation value, there is a problem in that rainbow color appears due to interference of light. Further, when a panel having slits in an electrode (comb like electrode) is employed as in the case where the liquid crystal display mode is an IPS (In Plane Switching) or an FFS (Fringe Field Switching) system, there is a problem in that the arrangement of the polarization film is influenced by the angle of the slits of the electrode.

SUMMARY

According to a first aspect of the invention, there is provided a liquid crystal display device including a first substrate in which a first electrode and a second electrode are provided, the second electrode having a plurality of line-shaped portions that generate an electric field between the first electrode, a second substrate opposing the first substrate, a liquid crystal layer sandwiched between the first substrate and the second substrate, the liquid crystal layer being partitioned into a plurality of display pixels each of which is driven by the electric field, a polarization film arranged outside the second substrate, and an optical member film arranged outside the polarization film. The optical member film has a front phase difference whose retardation value is in the range of 120 to 160 nm, and an angle of an optical axis of the optical member film with respect to an extending direction of the plurality of line-shaped portions of the second electrode is in the range of 30 to 40 degrees or 50 to 60 degrees.

According to the first aspect of the invention, the optical member film has a front phase difference whose retardation value is in the range of 120 to 160 nm, and the angle of the optical axis of the optical member film with respect to the extending direction of the plurality of line-shaped portions of the second electrode is in the range of 30 to 40 degrees or 50 to 60 degrees. Herewith, a rubbing angle is regulated from 5 to 15 degrees with respect to the extending direction of the plurality of line-shaped portions of the second electrode, the optical member film is arranged so that the optical axis thereof is inclined by 45 degrees with respect to the rubbing direction, and the light emitted to an observer side can be converted into circular polarized light (elliptically polarized light). Accordingly, the liquid crystal display device can be provided in which no rainbow color appears and no blackout occurs even when viewed from any direction when wearing polarization sunglasses.

According to a second aspect of the invention, there is provided a liquid crystal display device including a first substrate in which a first electrode and a second electrode are provided, the second electrode having a plurality of line-shaped portions that generate an electric field between the first electrode, a second substrate opposing the first substrate, a liquid crystal layer sandwiched between the first substrate and the second substrate, the liquid crystal layer being partitioned into a plurality of display pixels each of which is driven by the electric field, and a polarizing body arranged outside the second substrate. The polarizing body includes a polarizer and an optical member film arranged outside the polarizing body, the optical member film has a front phase difference whose retardation value is in the range of 120 to 160 nm, and an angle of an optical axis of the optical member film with respect to an extending direction of the plurality of line-shaped portions of the second electrode is in the range of 30 to 40 degrees or 50 to 60 degrees.

According to the second aspect of the invention, the optical member film has a front phase difference whose retardation value is in the range of 120 to 160 nm, and the angle of the optical axis of the optical member film with respect to the extending direction of the plurality of line-shaped portions of the second electrode is in the range of 30 to 40 degrees or 50 to 60 degrees. Herewith, a rubbing angle is regulated from 5 to 15 degrees with respect to the extending direction of the plurality of line-shaped portions of the second electrode, the optical member film is arranged so that the optical axis thereof is inclined by 45 degrees with respect to the rubbing direction, and the light emitted to an observer side can be converted into circular polarized light (elliptically polarized light). Accordingly, the liquid crystal display device can be provided in which no rainbow color appears and no blackout occurs even when viewed from any direction when wearing polarization sunglasses.

It is preferable that a surface treatment for protecting the optical member film is subjected to a surface of the optical member film in the liquid crystal display device according to the aspects of the invention.

According to the preferred aspect of the invention, it becomes easy to protect the surface of the optical member film from an external factor.

It is preferable that the optical member film is a uniaxial or biaxial retardation film in the liquid crystal display device according to the aspects of the invention.

According to the preferred aspect of the invention, visual feature of the optical member film becomes all around by the uniaxial retardation film or biaxial retardation film, so that very good feature can be achieved.

According to a third aspect of the invention, there is provided an electronic apparatus including the liquid crystal display device according to the aspects of the invention as a display unit.

According to the third aspect of the invention, the liquid crystal display device is mounted in the electronic apparatus. Accordingly, the electronic apparatus can be provided in which no rainbow color appears and no blackout occurs even when viewed from any direction when wearing polarization sunglasses.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
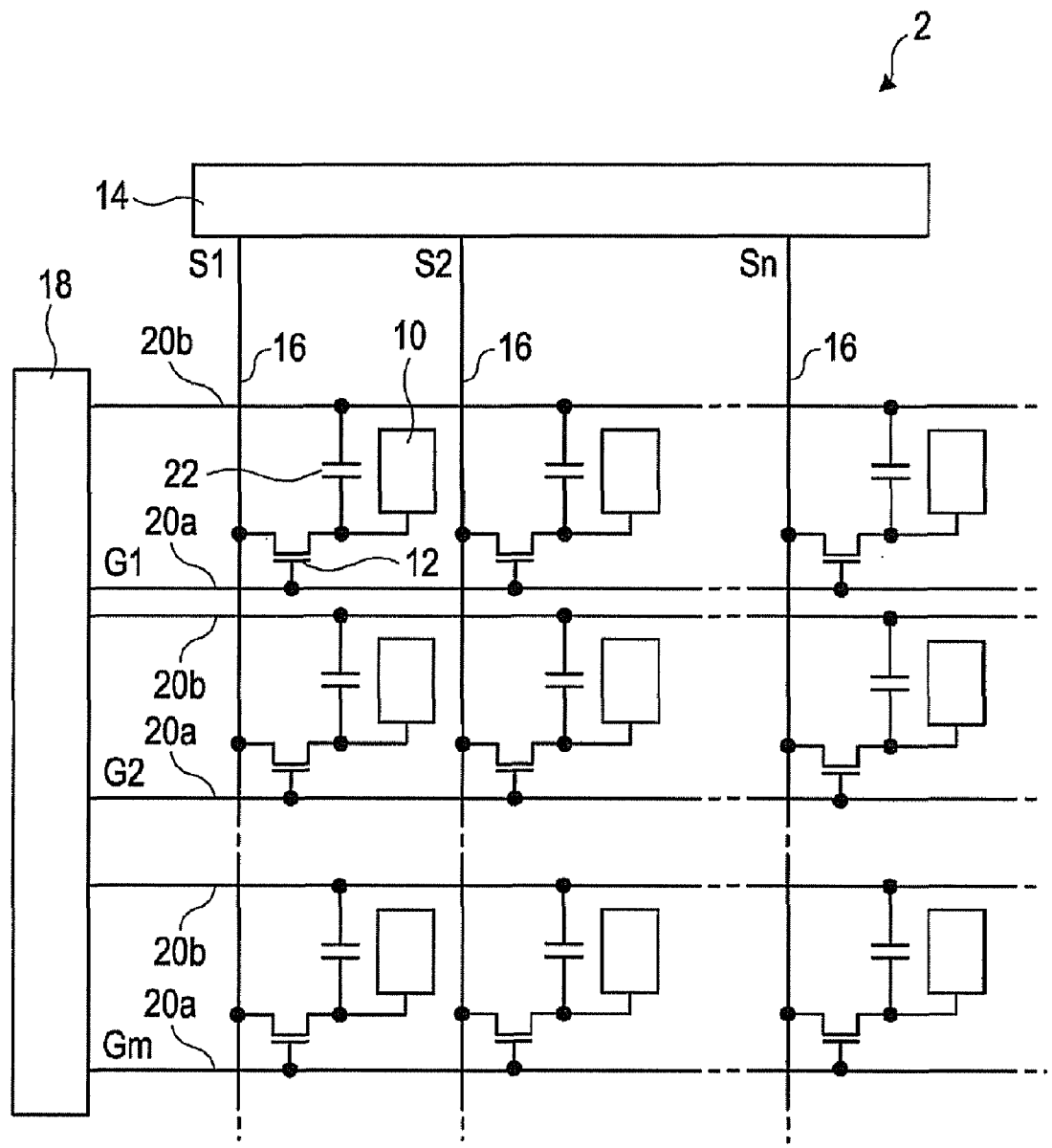
FIG. 1 is a diagram showing a circuit structure of a plurality of pixel areas formed in a matrix manner constituting a liquid crystal display device according to a first embodiment.

Hereinafter, embodiments of a liquid display device will be described with reference to the accompanying drawings. Note that, each layer and each member have a different scale in the drawings referred to in each embodiment in order to show each layer and each member so as to be recognized.

First Embodiment

FIG. 1 is a diagram showing a circuit structure of a plurality of pixel areas formed in a matrix manner constituting a liquid crystal display device 2 according to the embodiment.

The liquid crystal display device 2 of the embodiment is a liquid crystal display device employing an FFS system in which image display is performed by controlling an alignment of liquid crystal molecules of a liquid crystal layer by using a liquid crystal driving electric field (horizontal electric field or oblique electric field system) generated between different electrodes provided at a liquid crystal layer side on a same substrate. Further, the liquid crystal display device 2 is a color liquid crystal display device equipped with a color filter layer on a substrate, and three pixels that output each color light of R (red), G (green), B (blue) as transmitted light or reflected light constitute one color pixel. Accordingly, a display area that becomes the minimum unit constituting display is referred to as "pixel area".

An image display area is constituted by a plurality of pixel areas formed in a matrix manner in the liquid crystal display device 2 as shown in FIG. 1. A pixel electrode (second electrode) 12 and a TFT (Thin Film Transistor) 12 (or, TFD (Thin Film Diode)) for switch controlling the pixel electrode 10 are provided in each of the plurality of pixel areas. A data line 16 extending from a data line driving circuit 14 is electrically connected to the source of the TFT 12. The data line driving circuit 14 supplies image signals S1, S2 . . . , Sn to each pixel via the data lines 16. The image signals S1 to Sn may be line sequentially supplied in this order, or may be supplied for every group of plurality of data liens 16 adjacent to each other.

A scanning line 20a extending from a scanning line driving circuit 18 is electrically connected to the gate of the TFT 12, and scanning signals G1, G2, . . . , Gm supplied in pulses to the scanning line 20a from the scanning line driving circuit 18 at predetermined timings are to be line sequentially applied to the gates of the TFT's 12 in this order. The pixel electrode 10 is electrically connected to the drain of the TFT 12. When the TFT's 12 that are switching elements are turned on for a predetermined period by input of the scanning signals G1, G2, . . . , Gm, the image signals S1 S2, . . . , Sn supplied from the data lines 16 are written in the pixel electrodes 10 at predetermined timings.

The image signals S1, S2, . . . , Sn having predetermined levels written into liquid crystal via the pixel electrodes 10 are maintained for a predetermined period between the pixel electrode 10 and a common electrode (first electrode). Herein, a storage capacitor 22 is provided in parallel with a liquid crystal capacitor provided between the common electrode and the pixel electrode 10 in order to prevent leakage of the maintained image signal. The storage capacitor 22 is provided between the drain of the TFT 12 and a capacitor line 20b. In this manner, the TFT 12 is provided near the crossing pint of the data line 16 and the scanning line 20a.

Next, a detailed structure of the liquid crystal display device 2 will be described with reference to FIGS. 2 and 3.

Figure 2:
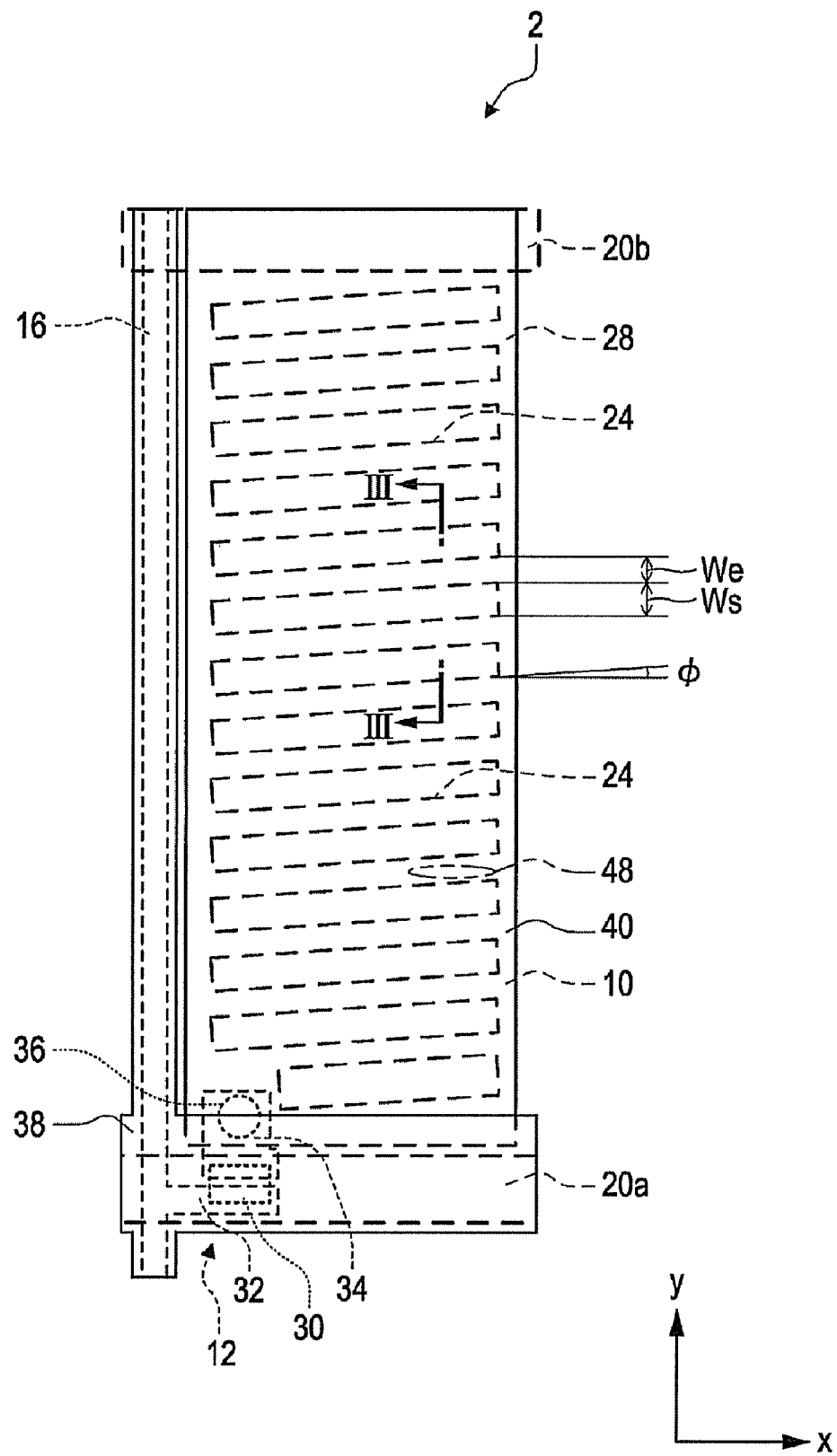
FIG. 2 is a plane view showing a structure of any one pixel area of the liquid crystal display device according to the first embodiment.

FIG. 2 is a plane view showing a structure of any one pixel area of the liquid crystal display device 2 according to the embodiment. FIG. 3 is a diagram showing a partial cross sectional structure taken along the line III-III of FIG. 2. As shown in FIG. 2, the pixel electrode 10 having a plurality of slits (line-shaped portions) 24, the longitudinal direction of the pixel electrode 10 being coincident with a Y axis direction (extending direction of the data line 16/wiring that supplies a signal) and the common electrode (first electrode) 28 having an approximately solid flat shape disposed to overlap with the pixel electrode 10 in plan view are provided in the pixel area of the liquid crystal display device 2.

The pixel electrode 10 is constituted by the plurality of slits 24 extending in the direction to have an angle φ in the anti clockwise direction with respect to an x axis direction (extending direction of the scanning line 20a/wiring that supplies a signal). For example, the angle φ is 5 degrees. The slits 24 are arranged to have a predetermined electrode width We and an electrode interval Ws.

The pixel electrode 10 and the common electrode 28 are formed by a conductive film made of a light transmissive conductive material such as ITO (indium tin oxide).

The data line 16 extending in the y axis direction, the scanning line 20a extending in the x axis direction, and the capacitor line 20b extending in parallel with the scanning line 20a so as to adjacent to the scanning line 20a are provided in the pixel area. The TFT 12 is provided near the crossing portion of the data line 16 and the scanning line 20a. The TFT 12 is equipped with a semiconductor layer 30 made of amorphous silicon partially provided in the plane area of the scanning line 20a, a source electrode 32 partially overlapped with the semiconductor layer 30 in plan view, and an drain electrode 34. The scanning line 20a functions as the gate electrode of the TFT 12 at the position overlapping with the semiconductor layer 30 in plan view. The pixel electrode 10 and the TFT 12 are connected via a contact hole 36. A black matrix layer 38 is provided to cover the TFT 12, the data line 16, and the scanning line 20a. Color filter layers 40 edged with the black matrix layer 38 are arranged for every pixel area.

Figure 3:
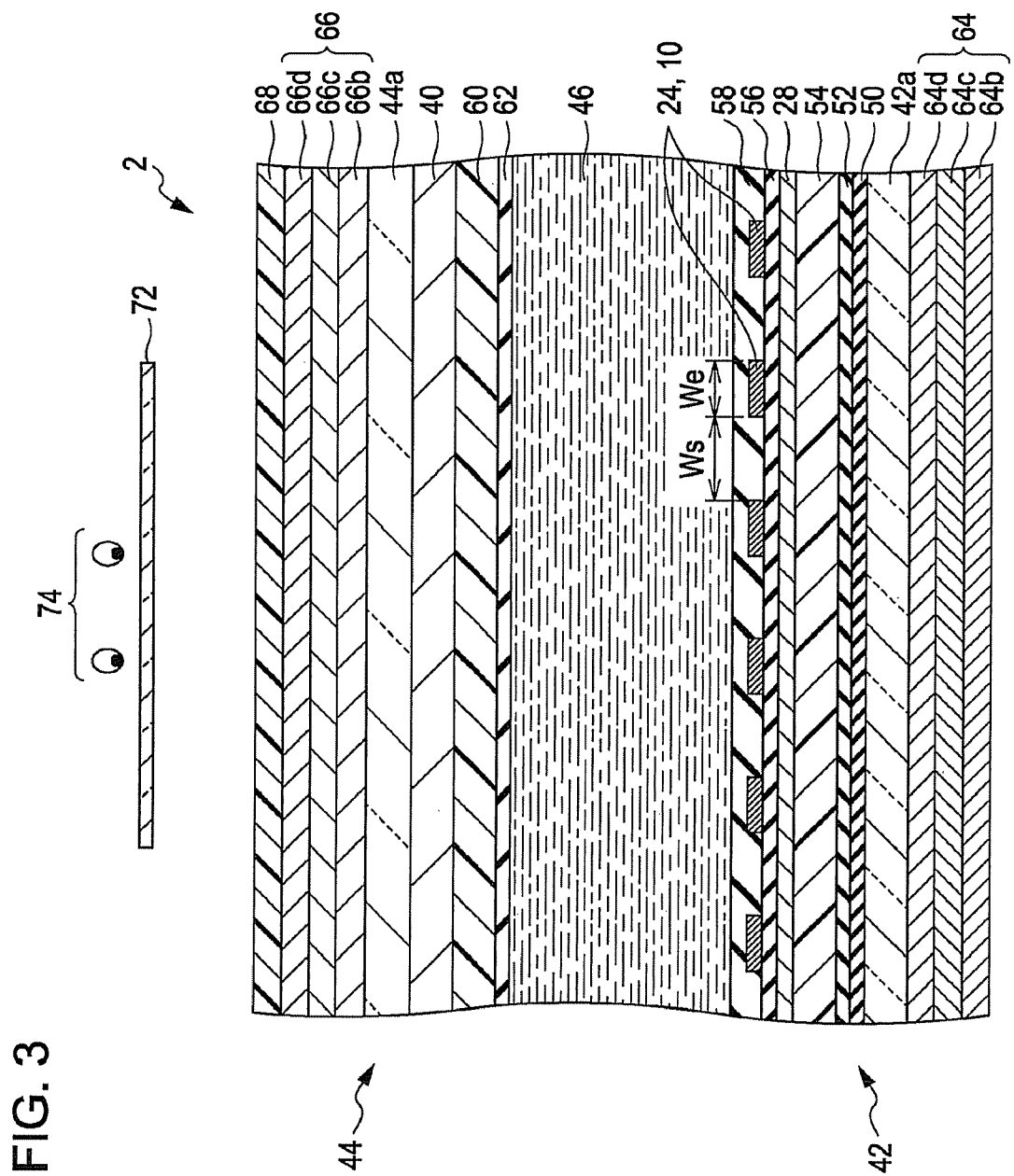
FIG. 3 is a diagram showing a partial cross sectional structure taken along the line III-III of FIG. 2.

As shown in FIG. 3, the liquid crystal display device 2 has a structure in which a liquid crystal layer 46 is sandwiched between an array substrate (first substrate) 42 and a counter substrate (second substrate) 44 oppositely disposed to each other. The liquid crystal layer 46 is sealed between the both substrates 42, 44 by a seal material (omitted in FIG. 3) provided along the outside edges of the both substrate 42, 44 in the opposing area between the array substrate 42 and the counter substrate 44. Liquid crystal molecules 48 (see FIG. 2) of the liquid crystal layer 46 are liquid crystal compositions showing a positive anisotropy of dielectric constant whose permittivity in an alignment direction is larger than that in the normal direction. An anti parallel rubbing treatment is subjected to the liquid crystal molecules 48 in parallel and in anti parallel to the x axis, and the liquid crystal alignment is homogeneous alignment. A back light (illumination device) (omitted in FIG. 3) is provided at the side opposite to the liquid crystal layer 46 of the array substrate 42 (back surface side/lower side of FIG. 3).

A substrate main body 42a made of a glass, a quartz, a plastic, or the like constitutes a base substance of the array substrate 42. The scanning line 20a and the capacitor line 20b (see FIG. 2) are provided at the liquid crystal layer 46 side of the substrate main body 42a, and a gate insulating film 50 is provided to cover the scanning line 20a and the capacitor line 20b.

The semiconductor layer 30 (see FIG. 2) is provided at the liquid crystal layer 46 side of the gate insulating film 50, and the source electrode 32 (see FIG. 2) and the drain electrode 34 (see FIG. 2) are provided so that a part thereof is provided on the semiconductor layer 30. The semiconductor layer 30 is oppositely disposed to the scanning line 20a via the gate insulating film 50, and the scanning line 20a constitutes the gate electrode of the TFT 12 (see FIG. 2) in the opposing area.

A first interlayer insulating film 52 made of oxide silicon or the like is provided to cover the semiconductor layer 30, the source electrode 32, and the drain electrode 34, and a planarizing layer 54 made of acrylic or the like is provided at the liquid crystal layer 46 side of the first interlayer insulating film 52.

The common electrode 28 is provided at the liquid crystal layer 46 side of the planarizing layer 54. The common electrode 28 is provided for every pixel area at the liquid crystal layer 46 side of the array substrate 42.

A second interlayer insulating film 56 made of silicon nitride or the like is provided to cover the common electrode 28.

The pixel electrode 10 is provided at the liquid crystal layer 46 side of the second interlayer insulating film 56. The pixel electrode 10 is constituted by the plurality of slits 24. The slits 24 are arranged to have the predetermined electrode width We and electrode interval Ws.

A horizontal alignment film 58 made of polyimide, silicon oxide, or the like is provided to cover the pixel electrode 10 and the second interlayer insulating film 56.

On the other hand, a substrate main body 44a made of a glass, a quartz, a plastic, or the like constitutes a base substance of the counter substrate 44, and the color filter layers 40 are provided at the liquid crystal layer 46 side of the substrate main body 44a. The color filter layers 40 include coloring layers having a different color to each other, and the back matrix layer 38 (see FIG. 2) made of a black resin or the like is arranged between the color filter layers 40 having different types of colors.

The color filter layer 40 is mainly formed by a color material layer corresponding to display color of each pixel. However, the color filter layer 40 may be separated into not less than two areas having a different chromaticity in the pixel area.

A planarizing layer 60 is provided at the liquid crystal layer 46 side of the color filter layer 40. The planarizing layer 60 is provided at the liquid crystal layer 46 side of the counter substrate 44 to planarize the step between the color filter layer 40 and the black matrix layer 38. Herewith, the thickness of the liquid crystal layer 46 is uniformed to prevent deterioration of contrast due to unevenness of driving voltage in the pixel area.

A horizontal alignment film 62 made of polyimide, silicon oxide, or the like is provided to cover the planarizing layer 60. The horizontal alignment film 62 is provided to contact with the liquid crystal layer 46. The horizontal alignment film 62 is formed by a sputter or the like. An anti parallel rubbing treatment is subjected to the horizontal alignment films 58, 62 in parallel and anti parallel to the x axis so that the liquid crystal alignment becomes homogeneous alignment.

First and second polarization films 64, 66 are respectively provided at the outer surface side of the substrate main bodies 42a, 44a as polarization films. A lower protection film 64b arranged inside, a polarizer 64c arranged outside the lower protection film 64b, and an upper protection film 64d arranged outside the polarizer 64c are provided as the first polarization film 64. The polarizer 64c is provided between the lower protection film 64b and the upper protection film 64d. A lower protection film 66b arranged inside, a polarizer 66c arranged outside the lower protection film 66b, and an upper protection film 66d arranged outside the polarizer 66c are provided as the second polarization film 66. The polarizer 66c is provided between the lower protection film 66b and the upper protection film 66d. The transmission axis of the first polarization film 64 and the transmission axis of the second polarization film 66 are perpendicular.

A retardation film (optical member film) 68 is provided outside the second polarization film 68. The retardation film 68 is bonded on the second polarization film 66 with an optical adhesive agent (not shown). The retardation film 68 is a uniaxial or biaxial retardation film. The retardation film 68 is an engineering plastic such as polycarbonate, cycloolefin polymer, liquid crystal polymer, polysulfone, or the like. A treatment such as hard coat film, anti glare, anti reflection, or the like is subjected on the surface of the retardation film 68. Herewith, it can be prevented that the retardation layer 68 on the second polarization film 66 is exposed, so that it becomes strong against damage caused by an external factor.

In the embodiment, an observer 74 wears polarization glasses 72 such as polarization sunglasses. That is, the polarization glasses 72 are polarizers. Accordingly, the liquid crystal display device 2 is to have one more polarizer outside the retardation film 68, that is, at the observer 74 side.

Each optical axis of the liquid crystal display device 2 of the embodiment constituted in this manner will be focused on. The optical axes include axes of the liquid crystal layer 46 of homogeneous alignment, the first polarization film 64, the second polarization film 66, and the retardation film 68. An anti parallel rubbing treatment is subjected to the liquid crystal molecules 48 in the direction parallel and anti parallel to the x axis. The transmission axis of the first polarization film 64 and the transmission axis of the second polarization film 66 are perpendicular, and the transmission axis of the first polarization film 64 is parallel to the x axis. This is the same structure as a transmission type IPS (In Plane Switching) system, so that a wide viewing angle that can be fit for a monitor can be achieved similarly to a transmission type IPS system.

Figure 4:
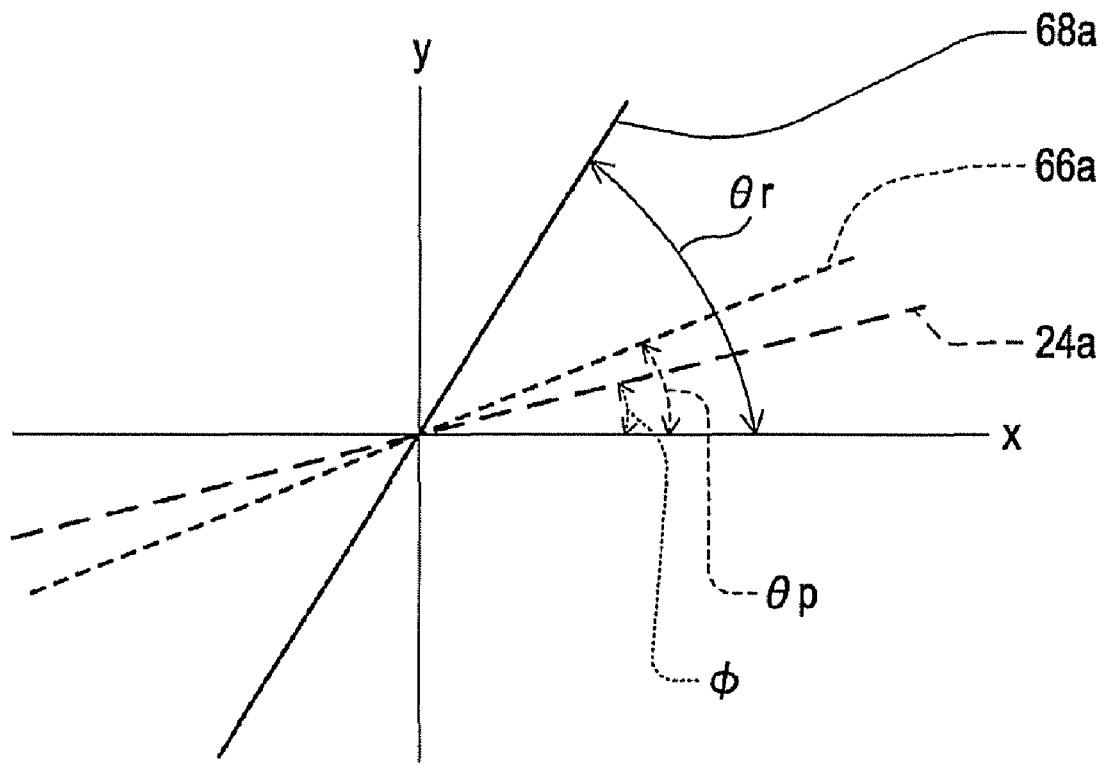
FIG. 4 is a diagram showing a configuration of each optical axis of the liquid crystal display device according to the first embodiment.

FIG. 4 is a diagram showing a configuration of each optical axis of the liquid crystal display device 2 according to the embodiment. FIG. 4 is a top view viewed from a normal direction of the array substrate 42 side after the array substrate 42 and the counter substrate 44 are assembled. As shown in FIG. 4, the extending direction of the plurality of slits 24 of the pixel electrode 10 makes an angle φ with respect to the x axis. An absorption axis 66a of the second polarization film 66 makes an angle θp with respect to the x axis. A slow axis (optical axis) 68a of the retardation layer 68 makes an angle θr with respect to the x axis. The retardation film 68 has a front phase difference whose retardation value is within a range of 120 to 160 nm (=λ/4: center wavelength 550 nm/4=about 135). In addition, the angle φ of the extending direction 24a of the plurality of slits 24 of the pixel electrode 10 and the angle θr of the slow axis 68a of the retardation film 68 satisfy the relation of 50 degrees≦|φ−θr|≦60 degrees. In the case where the arrangement mode of the second polarization film 66 is different, satisfy the relation of 30 degrees≦|φ−θr|≦40 degrees.

Figure 5:
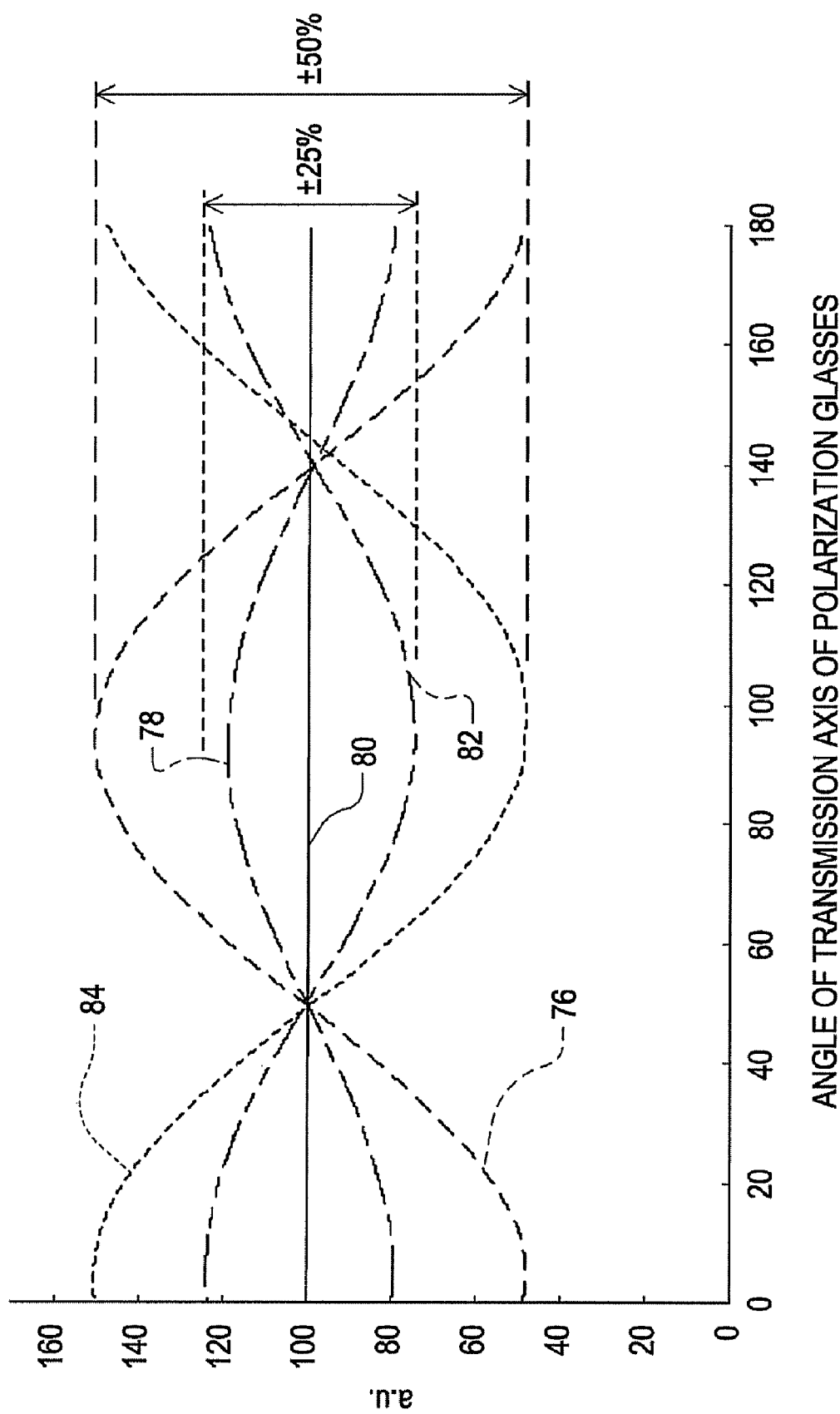
FIG. 5 is a graph showing a relation between a variation of the angle of the transmission axis of polarization glasses and a variation of display luminance at an observer side caused by the difference of a retardation value of a retardation film of the liquid crystal display device according to the embodiment.

FIG. 5 is a graph showing a relation between the variation of the angle of the transmission axis of the polarization glasses 72 (see FIG. 3) and the variation of display luminance at the observer 74 side (see FIG. 3) caused by the difference of the retardation value of the retardation film 68 (see FIG. 3) of the liquid crystal display device 2 according to the embodiment. With the difference of the retardation value of the retardation film 68, the display luminance of at the observer 74 side is largely varied by the difference of the angle of the transmission axis of the polarization glasses 72 with respect to the x axis direction when the liquid crystal display device 2 is rotated up and down and right and left.

A line 76 shown in FIG. 5 shows the variation of the display luminance at the observer 74 side with respect to the variation of the angle of the transmission axis of the polarization glasses 72 in the case where the retardation value of the retardation film 68 is 90 nm. A line 78 shows the variation of the display luminance at the observer 74 side with respect to the variation of the angle of the transmission axis of the polarization glasses 72 in the case where the retardation value of the retardation film 68 is 120 nm. A line 80 shows the variation of the display luminance at the observer 74 side with respect to the variation of the angle of the transmission axis of the polarization glasses 72 in the case where the retardation value of the retardation film 68 is 140 nm. A line 82 shows the variation of the display luminance at the observer 74 side with respect to the variation of the angle of the transmission axis of the polarization glasses 72 in the case where the retardation value of the retardation film 68 is 160 nm. A line 84 shows the variation of the display luminance at the observer 74 side with respect to the variation of the angle of the transmission axis of the polarization glasses 72 in the case where the retardation value of the retardation film 68 is 190 nm.

As shown in FIG. 5, the variation width of the display luminance with respect to the variation of the angle of the transmission axis of the polarization glasses 72 is the smallest in the case of the line 80, and the variation width of the display luminance with respect to the variation of the angle of the transmission axis of the polarization glasses 72 is the largest in the cases of the line 76 and the line 84. When the optimum value of the retardation value of the retardation film 68 arranged at the observer 74 side of the second polarization film 66 is regulated, the retardation value when the variation width of the luminance becomes not more than ±50% is between 90 to 190 nm and when becomes not more than ±25% is between 120 to 160 nm in the whole range of the angle of the transmission axis of the polarization glasses 72 which is 0 to 180 degrees. When the variation amount of the luminance becomes not less than 50%, the variation amount of the luminance when the liquid crystal display device 2 is rotated up and down and right and left becomes large, and this is not preferable. It is preferable that the variation amount of the luminance is not more than ±25%. In other words, the optimum value of the retardation value of the retardation film 68 arranged at the observer 74 side of the second polarization film 66 satisfies the relation that the retardation value has a front phase difference in the range of 120 to 160 nm.

Figure 6:
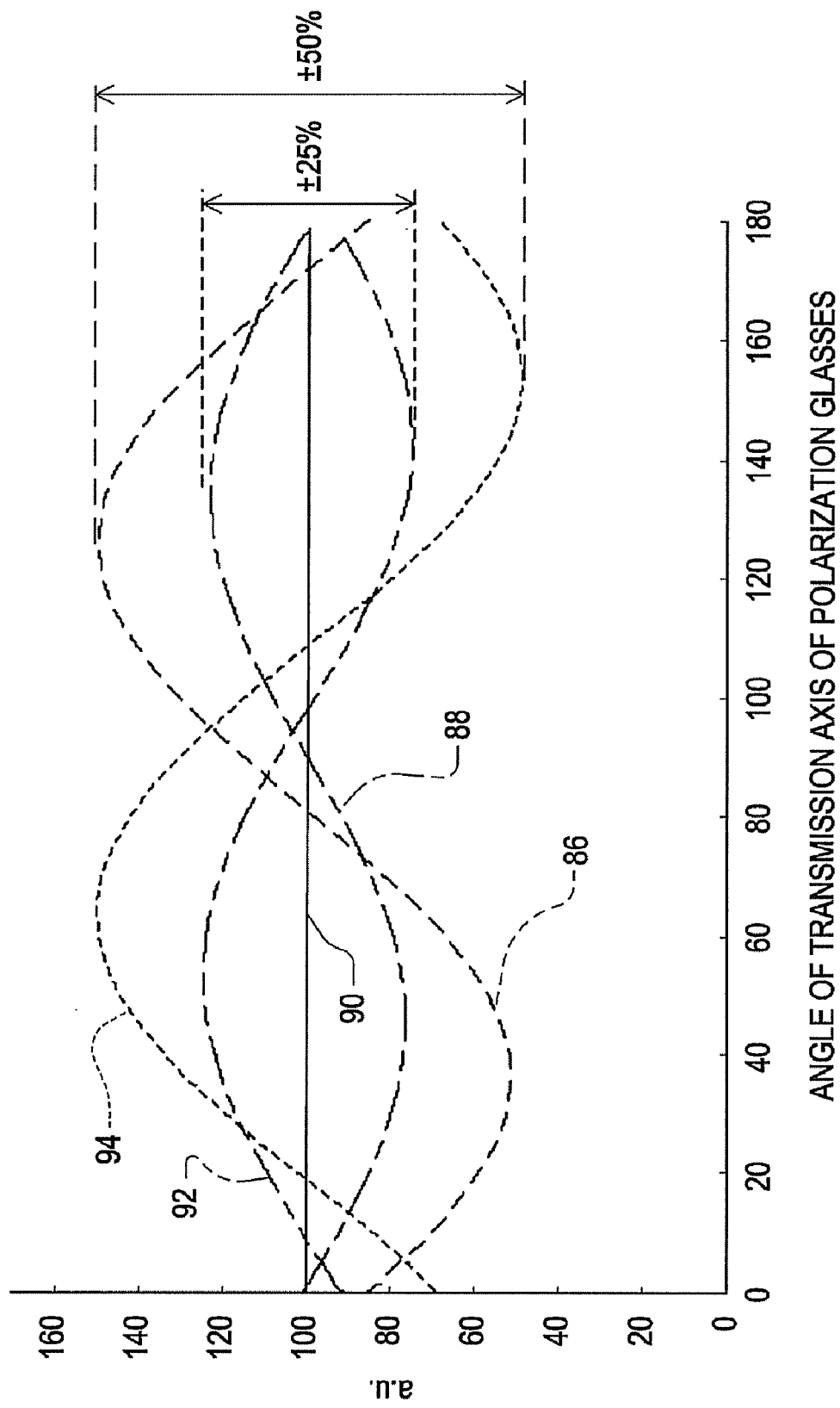
FIG. 6 is a graph showing a relation between a variation of the angle of the transmission axis of polarization glasses and a variation of display luminance at the observer side caused by the difference of the angle of the slow axis of the retardation film of the liquid crystal display device according to the embodiment.

FIG. 6 is a graph showing a relation between the variation of the angle of the transmission axis of the polarization glasses 72 (see FIG. 3) and the variation of the display luminance at the observer 74 side (see FIG. 3) caused by the difference of the angle of the slow axis 68a (see FIG. 4) of the retardation film 68 of the liquid crystal display device 2 according to the embodiment. By the difference of the angle of the slow axis 68a of the retardation film 68 with respect to the extending direction 24a of the plurality of slits 24 of the pixel electrode 10, when the liquid crystal display device 2 is rotated up and down and left and right while wearing the polarization glasses 72, the display luminance at the observer 74 side is largely varied by the difference of the angle of the transmission axis of the polarization glasses 72 with respect to the x axis direction.

A line 86 shown in FIG. 6 shows the variation of the display luminance at the observer 74 side with respect to the variation of the angle of the transmission axis of the polarization glasses 72 in the case where the angle of the slow axis 68a of the retardation film 68 with respect to the extending direction 24a of the plurality of slits 24 of the pixel electrode 10 is 40 degrees. A line 88 shows the variation of the display luminance at the observer 74 side with respect to the variation of the angle of the transmission axis of the polarization glasses 72 in the case where the angle of the slow axis 68a of the retardation film 68 with respect to the extending direction 24a of the plurality of slits 24 of the pixel electrode 10 is 50 degrees. A line 90 shows the variation of the display luminance at the observer 74 side with respect to the variation of the angle of the transmission axis of the polarization glasses 72 in the case where the angle of the slow axis 68a of the retardation film 68 with respect to the extending direction 24a of the plurality of slits 24 of the pixel electrode 10 is 55 degrees. A line 92 shows the variation of the display luminance at the observer 74 side with respect to the variation of the angle of the transmission axis of the polarization glasses 72 in the case where the angle of the slow axis 68a of the retardation film 68 with respect to the extending direction 24a of the plurality of slits 24 of the pixel electrode 10 is 60 degrees. A line 94 shows the variation of the display luminance at the observer 74 side with respect to the variation of the angle of the transmission axis of the polarization glasses 72 in the case where the angle of the slow axis 68a of the retardation film 68 with respect to the extending direction 24a of the plurality of slits 24 of the pixel electrode 10 is 70 degrees.

As shown in FIG. 6, the variation width of the display luminance with respect to the variation of the angle of the transmission axis of the polarization glasses 72 is the smallest in the case of the line 90, and the variation width of the display luminance with respect to the variation of the angle of the transmission axis of the polarization glasses 72 is the largest in the cases of the line 86 and the line 94. When the optimum value of the angle of the slow axis 68a of the retardation film 68 arranged at the observer 74 side of the second polarization film 66 with respect to the extending direction 24a of the plurality of slits 24 of the pixel electrode 10 is regulated, the angle when the variation width of the display luminance becomes not more than ±50% is between 40 to 70 degrees and when becomes not more than ±25% is between 50 to 60 degrees in the whole range of the angle of the transmission axis of the polarization glasses 72 which is 0 to 180 degrees. When the variation amount of the display luminance becomes not less than 50%, the variation amount of the display luminance when the liquid crystal display device 2 is rotated up and down and right and left becomes large and this is not preferable. It is preferable that the variation amount of the display luminance is not more than ±25%. In other words, the optimum value of the angle of the slow axis 68a of the retardation film 68 arranged at the observer 74 side of the second polarization film 66 with respect to the extending direction of the plurality of slits 24 of the pixel electrode 10 is in the range of 50 to 60 degrees.

Note that also in the case where the polarization film arrangement is O mode in which the optimum value of the angel of the slow axis 68a of the retardation film 68 arranged at the observer 74 side of the second polarization film 66 with respect to the extending direction 24a of the plurality of slits 24 of the pixel electrode 10 is in the range of 30 to 40 degrees, the same result is achieved. That is, the angle when the variation width of the luminance becomes not more than ±50% is between 20 to 50 degrees and when becomes not more than ±25% is between 30 to 40 degrees in the whole range of the angle of the transmission axis of the polarization glasses 72 which is 0 to 180 degrees.

According to the embodiment, in the liquid crystal display device 2, the retardation film 68 has the front phase whose retardation value is in the range of 120 to 160 nm and the angle of the slow axis 68a of the retardation film 68 with respect to the extending direction 24a of the plurality of slits 24 of the pixel electrode 10 is in the range of 30 to 40 degrees or 50 to 60 degrees. Herewith, the rubbing angle with respect to the extending direction 24a of the plurality of slits 24 of the pixel electrode 10 is regulated in the range of 5 to 15 degrees, the retardation film 68 is arranged so that the optical axis thereof is inclined by 45 degrees with respect to the rubbing direction, and the light emitted to the observer 74 side can be converted into circular polarized light (elliptically polarized light). Accordingly, the liquid crystal display device 2 can be provided in which no rainbow color appears and no blackout occurs even when viewed from any direction when wearing the polarization glasses 72.

Second Embodiment

Next, a second embodiment will be described with reference to the accompanying drawings.

Figure 7:
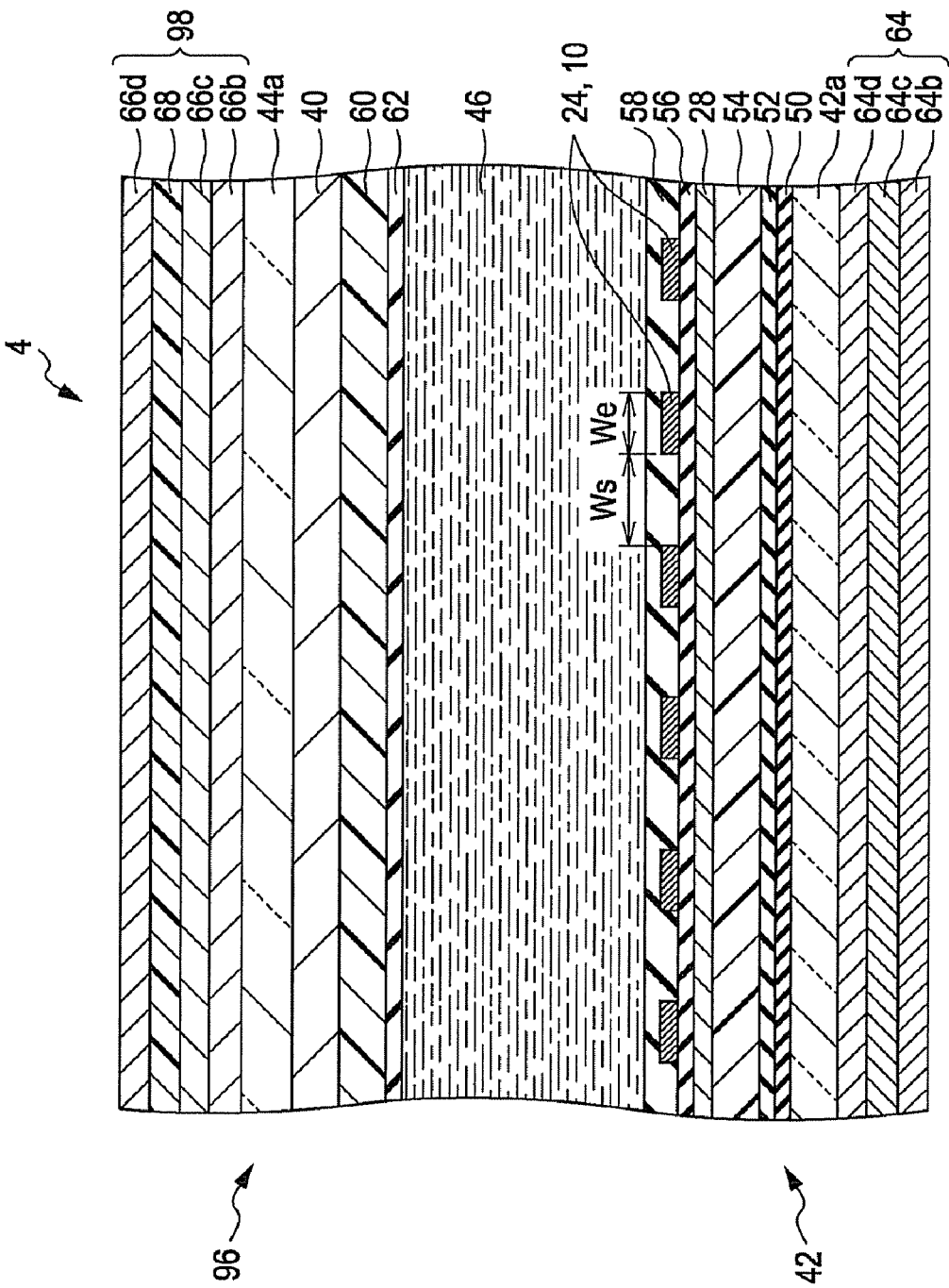
FIG. 7 is a partial cross sectional view showing a structure of a liquid crystal display device according to a second embodiment.

FIG. 7 is a partial cross sectional view showing a structure of a liquid crystal display device 4 according to the embodiment, and shows an aspect of the liquid crystal display device 4 when a pixel is cut along an array direction. Note that the liquid crystal display device 4 of the embodiment is a liquid crystal display device that employs an FFS system of a TFT active matrix system similarly to the liquid crystal display device 2 according to the first embodiment. The characteristic of the second embodiment is the position of the retardation film 68 to be arranged. The basic structure of the liquid crystal display device 4 of the embodiment is the same as the liquid crystal display device 2 of the first embodiment. Accordingly, the same reference numeral is used to designate the same element, and the detailed description will be omitted or simplified.

As shown in FIG. 7, a polarizing body 98 is provided at the outer surface side of the substrate main body 44a of a counter substrate (second substrate) 96. A lower protection film 66b arranged inside, a polarizer 66c arranged outside the lower protection film 66b, a retardation film (optical member film) 68 arranged outside the polarizer 66c so as to correspond to a display screen formed by a plurality of display pixels, and an upper protection film 66d arranged outside the retardation film 68 are provided as the polarizing body 98. The retardation film 68 is provided between the polarizer 66c and the upper protection film 66d. The transmission axis of the first polarization film 64 and the transmission axis of the polarizing body 98 are perpendicular.

The retardation film 68 is provided at the outer surface side of the polarizer 66c. the retardation film 68 is bonded on the polarizer 66c by an optical adhesive agent (not shown). Herewith, it can be prevented that the retardation layer 68 on the polarizer 66c is exposed, so that it becomes strong against damage caused by an external factor. The upper protection film 66d is cellulose triacetate. By using cellulose triacetate as the upper protection film 66d, a surface treatment such as anti glare, anti reflection, or the like can be easily performed. By subjecting a surface treatment in this manner, optical property is improved.

Electronic Apparatus

Figure 8:
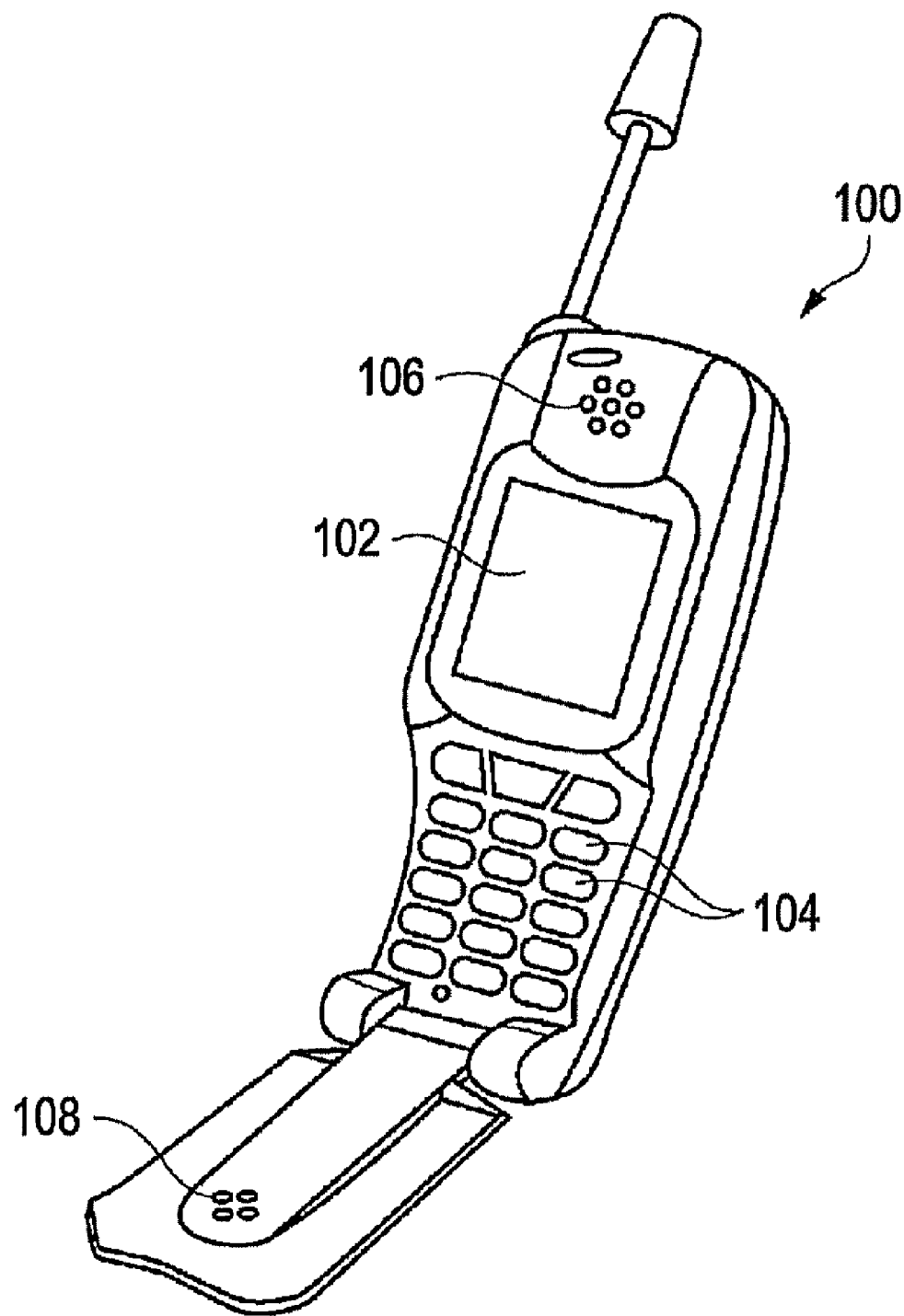
FIG. 8 is a perspective view showing an example of an electronic apparatus according to an embodiment.

FIG. 8 is a perspective view showing an example of an electronic apparatus according to the embodiment. A mobile phone 100 shown in FIG. 8 is equipped with the liquid crystal display device of the embodiment as a display unit 102 of a small size, and is equipped with a plurality of operation buttons 104, an ear piece 106, and a mouth piece 108.

The liquid crystal display device according to the embodiment can be preferably used not only for the mobile phone, but also as image display means such as an electronic book, a personal computer, a digital still camera, a liquid crystal television, a view-finder type or a monitor direct-sight type video tape recorder, a car navigation device, a pager, an electronic notebook, an electronic calculator, a word processor, a work station, a television telephone, a POS terminal, an apparatus equipped with a touch panel, or the like. In any electronic apparatus, good display quality can be provided. That is, no rainbow color appears and no blackout occurs even when viewed from any direction when wearing the polarization glasses.

The embodiments are described with reference to the accompanying drawings. However, it should be understood that the invention is not limited to the embodiments. For example, in the embodiments, the electrode interval Ws of the slits 24 of the pixel electrode 10 constitute slits. However, the structure of the electrode is not limited to this, and the pixel electrode 10 may be a comb-like electrode.

In the embodiments, the common electrode 28 is an approximately solid flat electrode, and the pixel electrode 10 is equipped with the plurality of slits 24. However the structure of the electrodes is not limited to this, and each of the pixel electrode 10 and the common electrode 28 may be equipped with a plurality of strip-shaped electrodes. That is, an electric field generating (horizontal electric field) system may be employed in which the pixel electrode 10 and the common electrode 28 are opposed in the same layer so as to adjacent in plan view. For example, an electrode structure may be employed in which both of the common electrode and the pixel electrode are electrodes having a comb-like shape in plan view, and the strip-shaped electrodes constituting the comb-like portion are arranged so as to engage with each other. The similar effects as the embodiments can be achieved even when the structure of the electrodes is changed in this manner.

Further, in the embodiments, the structure is employed in which the upper electrode is the pixel electrode 10 and the lower electrode is the common electrode 28. However, the structure of the electrodes is not limited to this, and the similar properties can be achieved even when the structure is employed in which the lower electrode is the pixel electrode 10 and the upper electrode is the common electrode 28.

Further, in the embodiments, the liquid crystal display mode is an FFS system. However, the liquid crystal display mode is not limited to this, and an IPS system in which liquid crystal molecules are switched by using an electric field approximately parallel to the glass substrate surface, or the like may be employed.

What is claimed is:

1. A liquid crystal display device comprising:
   a first substrate in which a first electrode and a second electrode are provided, the second electrode having a plurality of line-shaped portions that generate an electric field between the first electrode;
   a second substrate opposing the first substrate;
   a liquid crystal layer sandwiched between the first substrate and the second substrate, the liquid crystal layer being partitioned into a plurality of display pixels each of which is driven by the electric field;
   a polarization film arranged outside the second substrate; and
   an optical member film arranged outside the polarization film, wherein
   the optical member film has a front phase difference whose retardation value is in the range of 120 to 160 nm, and
   an angle of an optical axis of the optical member film with respect to an extending direction of the plurality of line-shaped portions of the second electrode is in the range of 30 to 40 degrees or 50 to 60 degrees.

2. A liquid crystal display device comprising:
   a first substrate in which a first electrode and a second electrode are provided, the second electrode having a plurality of line-shaped portions that generate an electric field between the first electrode;
   a second substrate opposing the first substrate;
   a liquid crystal layer sandwiched between the first substrate and the second substrate, the liquid crystal layer being partitioned into a plurality of display pixels each of which is driven by the electric field; and
   a polarizing body arranged outside the second substrate; wherein
   the polarizing body includes a polarizer and an optical member film arranged outside the polarizing body,
   the optical member film has a front phase difference whose retardation value is in the range of 120 to 160 nm, and
   an angle of an optical axis of the optical member film with respect to an extending direction of the plurality of line-shaped portions of the second electrode is in the range of 30 to 40 degrees or 50 to 60 degrees.

3. The liquid crystal display device according to claim 1, wherein
   a surface treatment for protecting the optical member film is subjected to a surface of the optical member film.

4. The liquid crystal display device according to claim 1, wherein
   the optical member film is a uniaxial or biaxial retardation film.

5. An electronic apparatus comprising the liquid crystal display device according to claim 1 as a display unit.

* * * * *